United States Patent
Yu et al.

(10) Patent No.: US 7,590,201 B2
(45) Date of Patent: Sep. 15, 2009

(54) METHOD FOR DETECTING SIGNAL IN MULTIPLE INPUT MULTIPLE OUTPUT SYSTEM AND RECEIVING DEVICE OF MULTIPLE INPUT MULTIPLE OUTPUT SYSTEM

(75) Inventors: Heejung Yu, Daejeon (KR); Taehyun Jeon, Sungnam (KR); Myung-Soon Kim, Daejeon (KR); Eun-Young Choi, Daejeon (KR); Sok-Kyu Lee, Daejeon (KR); Deuk-Su Lyu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 666 days.

(21) Appl. No.: 11/198,595

(22) Filed: Aug. 4, 2005

(65) Prior Publication Data
US 2005/0276362 A1 Dec. 15, 2005

(30) Foreign Application Priority Data
Feb. 12, 2004 (KR) ............... 10-2004-0100287

(51) Int. Cl.
*H04L 1/02* (2006.01)
(52) U.S. Cl. ............... 375/347; 375/316; 375/219; 375/259; 455/73; 704/242; 714/795
(58) Field of Classification Search ......... 375/347, 375/316, 219, 259; 455/73; 704/242; 714/795
See application file for complete search history.

(56) References Cited
U.S. PATENT DOCUMENTS

| | | | |
|---|---|---|---|
| 6,097,771 A | 8/2000 | Foschini | |
| 6,757,337 B2 | 6/2004 | Zhuang et al. | |
| 2004/0047438 A1* | 3/2004 | Zhuang et al. | ........... 375/340 |
| 2004/0066866 A1* | 4/2004 | Tong et al. | ............... 375/347 |
| 2004/0083082 A1* | 4/2004 | Onggosanusi et al. | ........ 703/2 |

FOREIGN PATENT DOCUMENTS

KR 10-1998-0013075 A 4/1998

OTHER PUBLICATIONS

P. W. Wolniansky, et al, 'V-BLAST: An Architecture for Realizing Very High Data Rats Over the Rich-Scattering Wireless Channel'; URSI, pp. 295~300, Sep. 1998.
Emanuele Vitervo, et al, 'A universal lattice code decoder for fading channels', IEEE transaction on information theory, vol. 45, No. 5, pp. 1639-1642 Jul. 1999.

* cited by examiner

*Primary Examiner*—Mohammad H Ghayour
*Assistant Examiner*—Zewdu Kassa
(74) *Attorney, Agent, or Firm*—Blakely, Sokoloff, Taylor & Zafman LLP

(57) ABSTRACT

The present invention relates to a method for detecting a signal in an MIMO system. In the method, a received signal is detected in a zero forcing (ZF) method, and a first detection interval is established from the signal detected in the ZF method. The received signal is detected within the first detection interval in a maximum likelihood (ML) method, a second detection interval is established from the signals respectively detected in the ZF method and the ML method. A final solution is determined by detecting the received signal within the second detection interval in the ML method.

11 Claims, 7 Drawing Sheets

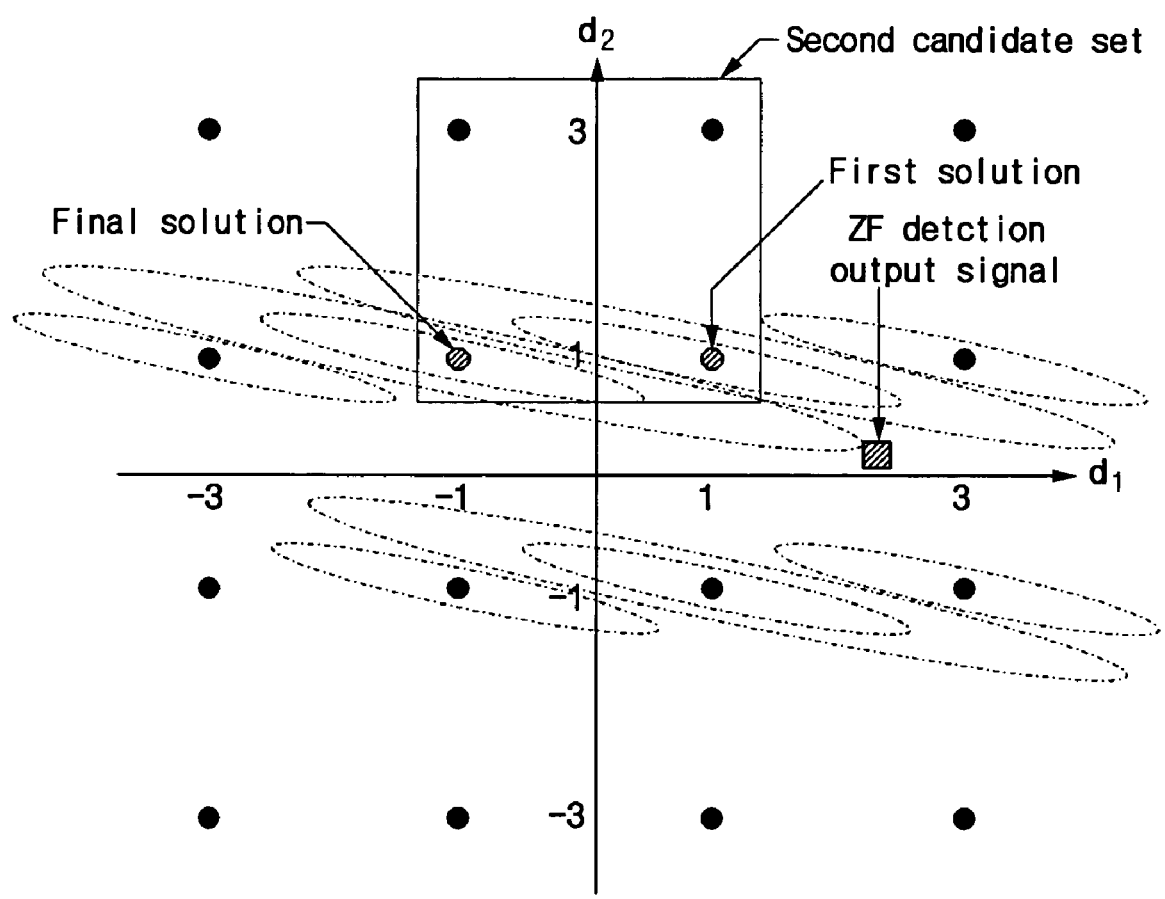

METHOD FOR DETECTING SIGNAL IN MULTIPLE INPUT MULTIPLE OUTPUT SYSTEM AND RECEIVING DEVICE OF MULTIPLE INPUT MULTIPLE OUTPUT SYSTEM

CROSS-REFERENCE TO RELATED APPLICATION

This application claims priority to and the benefit of Korean Patent Application 10-2004-0100287 filed in the Korean Intellectual Property Office on Dec. 02, 2004, the entire content of which is incorporated herein by reference.

BACKGROUND OF THE INVENTION (a) Field of the Invention

The present invention relates to a signal detection system in a multiple input multiple output (MIMO) system and a method thereof. More specifically, the present invention relates to a signal detection technique in an MIMO system using a high level modulation technique.

(b) Description of the Related Art

Various studies of detection techniques for a multiple input multiple output (MIMO) system have been ongoing in a like manner of a multiple user detection technique of code division multiple access (CDMA). A linear detection technique, one of the detection techniques for the MIMO, is classified as a zero forcing method (ZF) using an inverse matrix of channels, and a minimum mean-squared estimate (MMSE) method considering noise amplification in the ZF method. While the linear detection technique is simple to be realized, the performance is quickly deteriorated compared to other detection techniques.

In an ordered successive interference cancellation (OSIC) method known as a vertical Bell Labs layered space time architecture (V-BLAST), the linear detection is repeatedly performed by detecting a proper quality data symbols, eliminating the effect caused by the previously detected symbols, and then detecting the data symbols. While the performance is expected to be improved in the OSIC method compared to conventional linear detection methods, its complexity may also be increased. In addition, a maximum likelihood (ML) method is for selecting a combination minimizing a cost function by calculating the cost function of all kinds of transmitted symbol candidates. However, in the ML method, complexity is increased according to the number of constellations varied by modulation methods and the number of antennas.

The information disclosed in this Background of the Invention section is only for enhancement of understanding of the background of the invention, and therefore, unless explicitly described to the contrary, it should not be taken as an acknowledgement or any form of suggestion that this information forms the prior art that is already known in this country to a person of ordinary skill in the art.

SUMMARY OF THE INVENTION

The present invention has been made in an effort to provide a detection method having advantages of less complexity compared to an ML method and higher performance compared to a ZF method, in which the ZF method and the ML method are combined.

In an exemplary receiver of a multiple input multiple output system for transmitting signals by a plurality of transmit antennas and receiving the transmitted signals by a plurality of receive antennas through a channel according to an exemplary embodiment of the present invention, the receiver includes a first detector, a first candidate determining unit, a second detector, a second candidate determining unit, and a third detector. The first detector estimates the transmission signal from the received signal with reference to channel information. The first candidate determining unit determines a plurality of constellations close to an output signal of the first detector as first candidates for each transmit antenna. The second detector determines a first solution of the received signal among a combination of the first candidates. The second candidate determining unit determines a plurality of constellations in a direction of the first solution from the output signal of the first detector as second candidates for each transmit antenna. The third detector detects the received signal after determining a second solution of the received signal among a combination of the second candidates.

In another exemplary method for detecting a received signal in a multiple input multiple output system for transmitting transmission signals by a plurality of transmit antennas and receiving the transmitted signals by a plurality of receive antennas through a channel, an output signal is outputted after detecting the transmission signal from the received signal by using an inverse matrix of a channel matrix representing channel characteristics. A plurality of constellations close to the output signal are determined as first candidates for each transmit antenna, and a first solution minimizing a cost function of the received signal is determined among a combination of the first candidates A plurality of constellations in a direction of the first solution from the output signal are then determined as second candidates for each transmission signal, and a second solution minimizing a cost function of the received signal is determined among a combination of the second candidates.

BRIEF DESCRIPTION OF THE DRAWINGS

FIG. 4c shows a diagram for representing a method for determining a final solution according to an exemplary embodiment of the present invention.

DETAILED DESCRIPTION OF THE PREFERRED EMBODIMENTS

Figure 1:
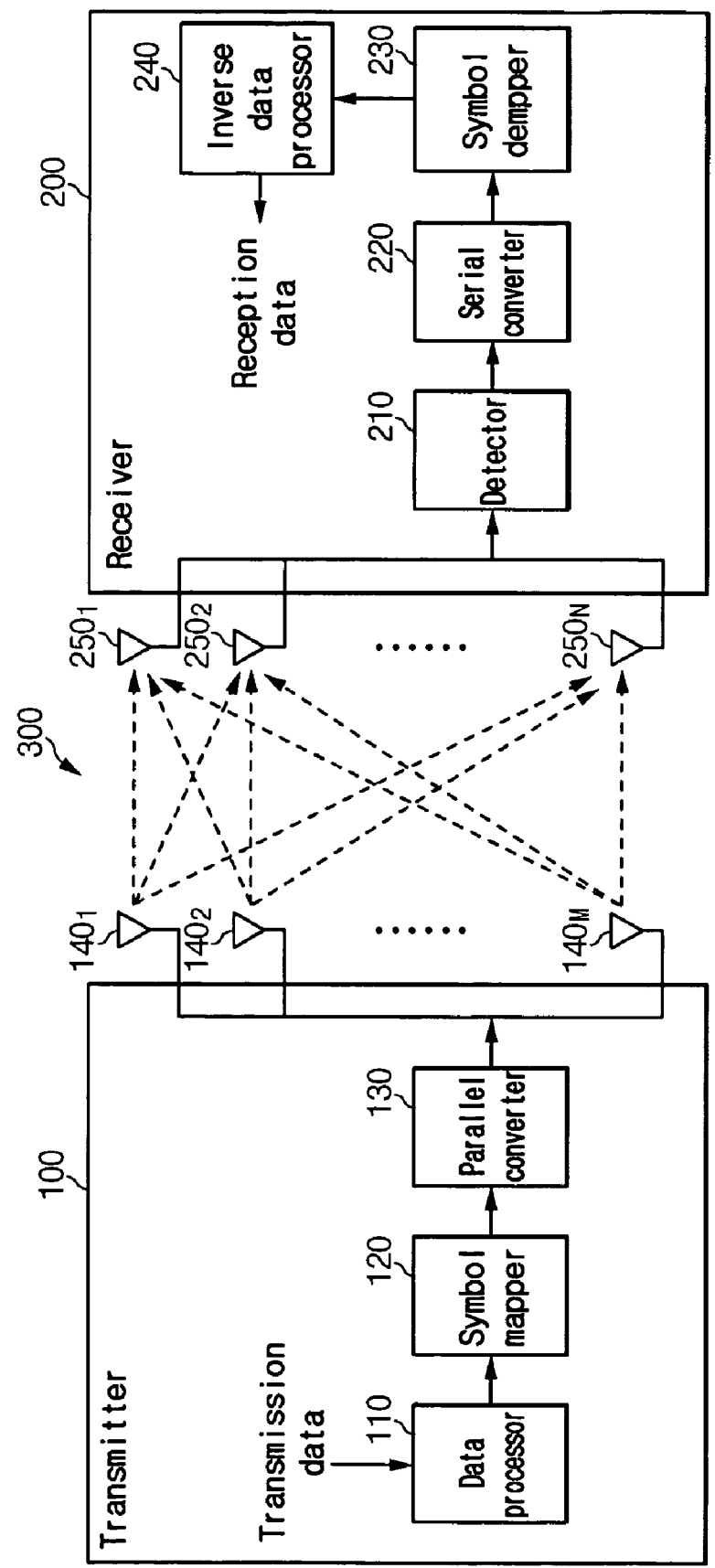
FIG. 1 shows a schematic diagram of a multiple input multiple output (MIMO) system according to an exemplary embodiment of the present invention.

An exemplary embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature, and not restrictive. Like reference numerals designate like elements throughout the specification.

A signal detection method and a receiver of a multiple input multiple output (MIMO) system according to an exemplary embodiment of the present invention will be described with reference to figures.

FIG. 1 shows a schematic diagram of a multiple input multiple output (MIMO) system according to an exemplary embodiment of the present invention. High level modulation methods (e.g., a 16 quadrature amplitude modulation (QAM) method and a 64 QAM method) may be used in the exemplary embodiment of the present invention.

As shown in FIG. 1, the MIMO system includes a transmitter 100 and a receiver 200, and data are transmitted from the transmitter to the receiver 200 through a flat fading channel 300. The transmitter 100 includes a data processor 110, a symbol mapper 120, a parallel converter 130, and M transmit antennas 1401 to 140M, and the receiver 200 includes a detector 210, a serial converter 220, a symbol demapper 230, an inverse data processor 240, and N receive antennas 2501 to 250N.

The data processor 110 performs scrambling, error correction coding, and interleaving transmission data and transmits the transmission data to the symbol mapper 120. The transmission data transmitted to the data processor 110 is binary data transmitted from a medium access control (MAC) layer to a physical layer. The symbol mapper 120 maps the transmission data to a symbol according to the modulation methods. The parallel converter 130 parallelizes the mapped symbol according to the number of transmit antennas 1401 to 140M as shown in Equation 1. Respective symbols of the parallelized transmission signal d are transmitted through the transmit antennas 1401 to 140M in parallel. The parallelized transmission signal d is an M×1 vector as shown in Equation 1.

$$d=[d_1, d_2, \ldots, d_M]^T \quad \text{[Equation 1]}$$

The transmission signal d is transmitted to the receiver 200 in parallel by the receive antennas 2501 to 250N through the flat fading channel 300. A reception signal y is converted by the flat fading channel 300, and a noise vector u is added to the reception signal y, which is shown as Equation 2.

$$y=[y_1, y_2, \ldots, y_N]^T=Hd+u \quad \text{[Equation 2]}$$

, where H denotes an N×M flat fading channel matrix, and u denotes an N×1 matrix additive white Gaussian noise (AWGN) which is given as $u=[u_1, u_2, \ldots, u_n]$. The detector 210 of the receiver 200 detects the reception signal y and estimates transmission symbols.

The serial converter 220 converts parallel outputs of the detector 210 into serial-type symbols, and transmit the serial-type symbols to the symbol demapper 230. The symbol demapper 230 performs an inverse operation of the symbol mapper 120. That is, the symbol demapper 230 demaps the received symbols to corresponding binary data. In an inverse order of the data processor 110, the inverse data processor 240 performs descrambling, decoding of the error correction coding, and deinterleaving which are inverse processes of the data processor 110. The above-processed reception data means information to be transmitted to the MAC layer.

A detection method in the detector 210 of the receiver 200 shown in FIG. 1 will be described with reference to FIG. 2 to FIG. 4c.

Figure 2:
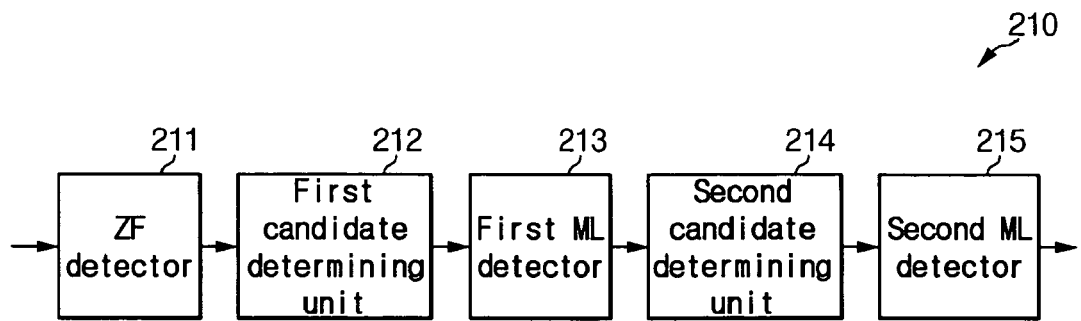
FIG. 2 shows a schematic diagram of a detector of a receiver according to an exemplary embodiment of the present invention.
Figure 3:
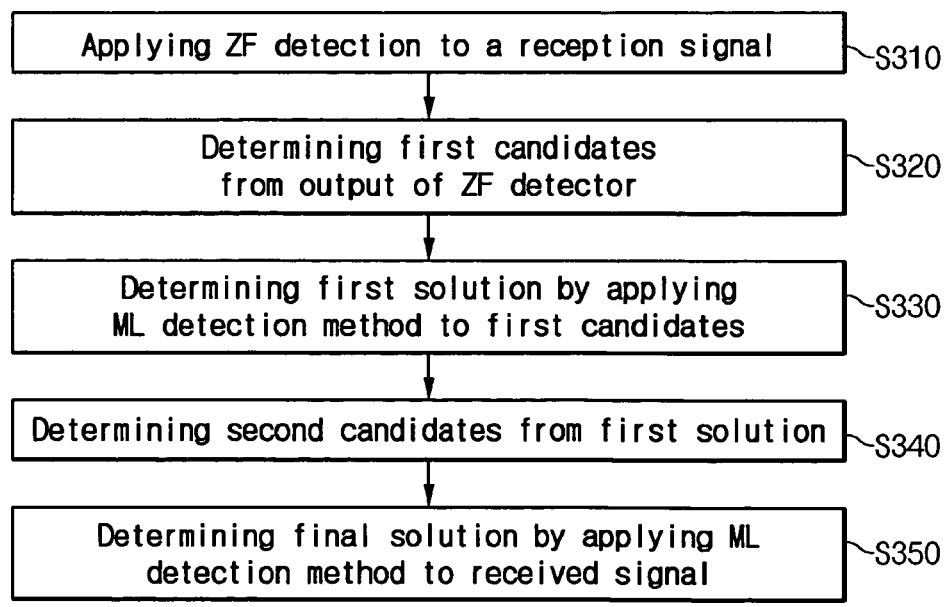
FIG. 3 shows a flow chart for representing a detection method in the detector according to an exemplary embodiment of the present invention.
Figure 4A:
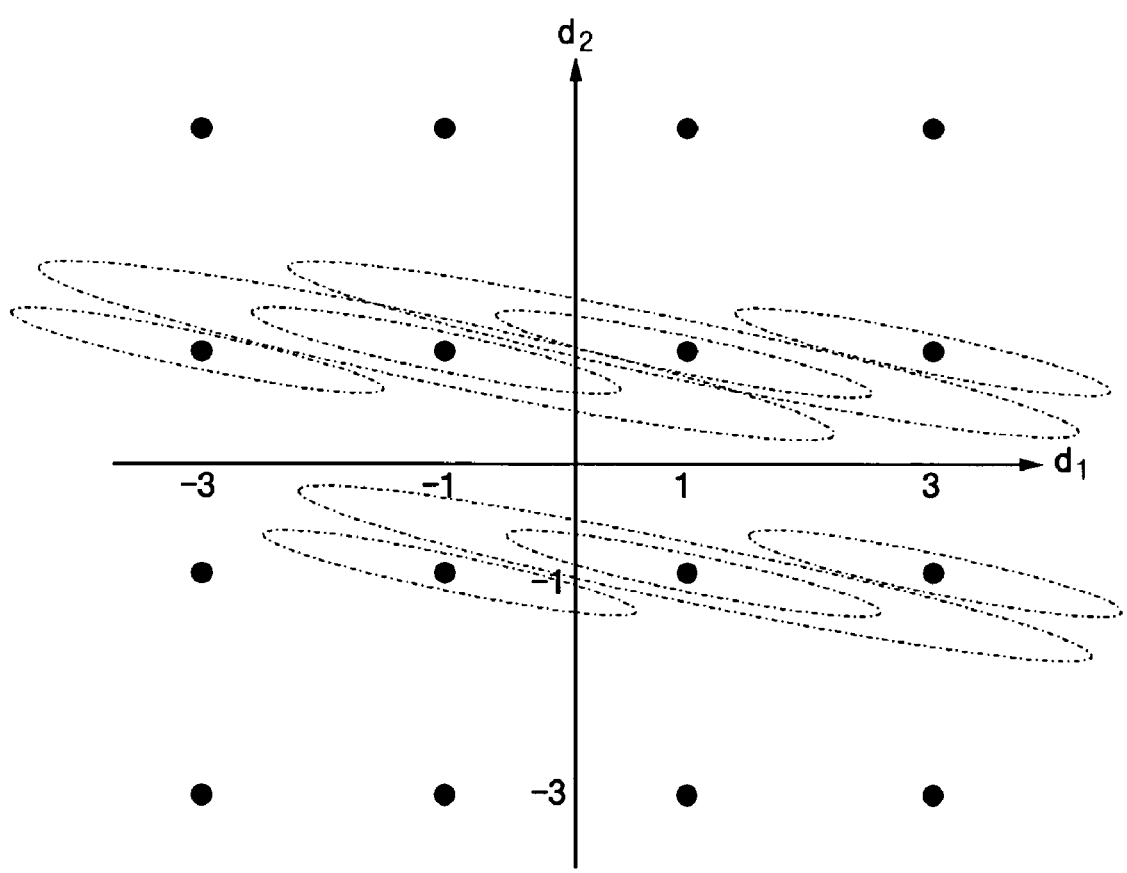
FIG. 4a shows a diagram for representing distribution of constellations of received signals according to an exemplary embodiment of the present invention.
Figure 4B:
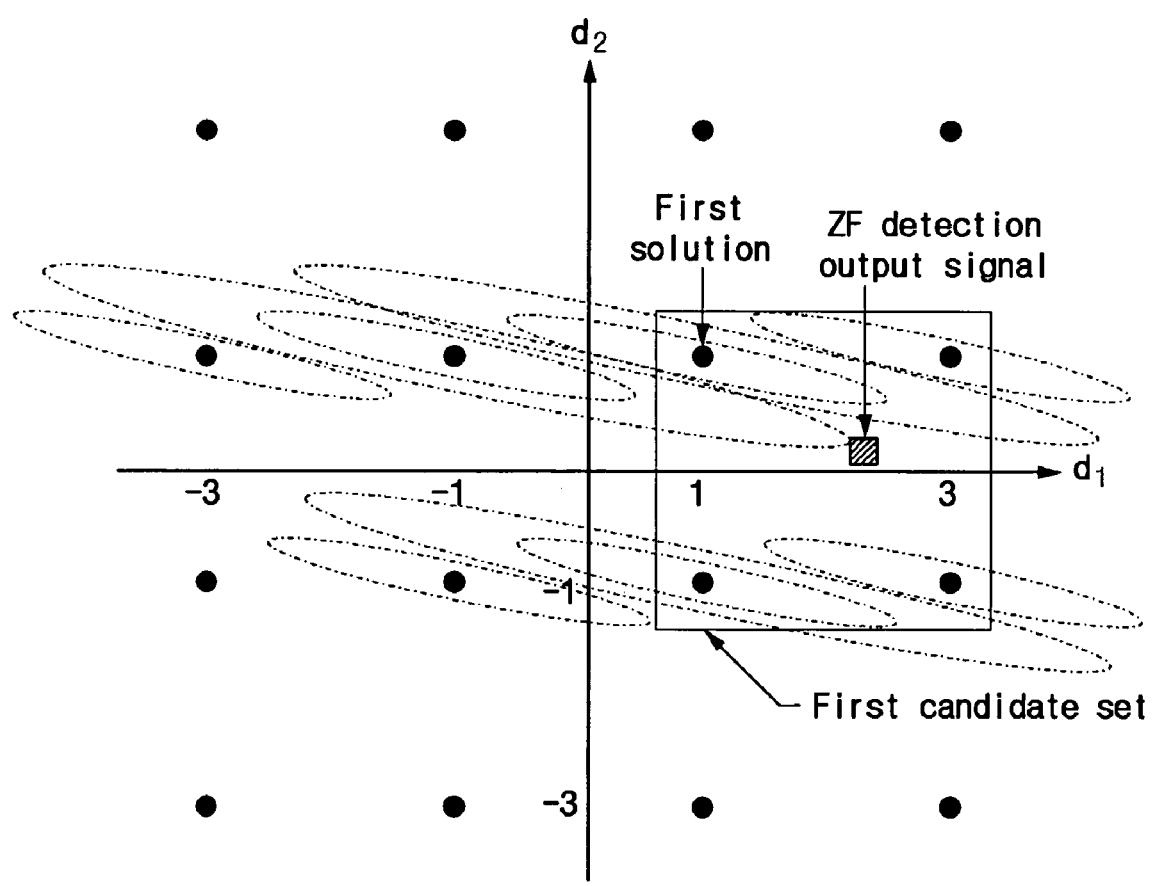
FIG. 4b shows a diagram for representing a method for determining a first solution according to an exemplary embodiment of the present invention.

FIG. 2 shows a schematic diagram of the detector 210 of the receiver 200 according to the exemplary embodiment of the present invention, and FIG. 3 shows a flow chart for representing a detection method in the detector 210 according to the exemplary embodiment of the present invention. FIG. 4a shows a diagram for representing distribution of constellations of received signals according to the exemplary embodiment of the present invention, FIG. 4b shows a diagram for representing a method for determining a first solution according to the exemplary embodiment of the present invention, and FIG. 4c shows a diagram for representing a method for determining a final solution according to the exemplary embodiment of the present invention.

In the exemplary embodiment of the present invention, it will be described that four constellations for each transmission signal are used as candidates. For convenience of descriptions, it will be assumed that two transmit antennas 1401 and 1402 and two receive antennas 2501 and 2502 (M=N=2) are used.

As shown in FIG. 2, the detector 210 of the receiver 200 includes a zero forcing (ZF) detector 211, a first candidate determining unit 212, a first maximum likelihood (ML) detector 213, a second candidate determining unit 214, and a second ML detector 215.

As shown in FIG. 3, the ZF detector 211 of the detector 210 applies an inverse matrix $H^+$ of a channel matrix to the received signal y in step S310. The inverse matrix of a channel matrix is a transfer function of a ZF detection method. An output signal z of the ZF detector 211 will be as shown in Equation 3.

$$z=H^+y=[z_1, z_2]^T \quad \text{[Equation 3]}$$

, where $H^+$ denotes an M×N inverse matrix of a channel matrix H (M=2 and N=2), and z denotes an output signal of the ZF detector which is an M×1 matrix (M=2).

As shown in FIG. 3 and FIG. 4b, the first candidate determining unit 212 of the detector 210 detects four constellations close to the output signal z of the ZF detector 211 for each transmit antenna in step S320. The four constellations determined for each transmit antenna are established to be a first candidate set $C^{M1}$. The first candidate set $C^{M1}$ includes $4^2$ combinations in total.

The first ML detector 213 of the detector 210 detects a first solution s in step S330 by applying the ML detection method to the received signal y and the first candidate set $C^{M1}$ determined in step S320 as shown in Equation 4. That is, the first ML detector 213 selects a constellation of the first candidate set $C^{M1}$ as the first solution s, in which a cost function $\|y-Hc_1\|^2$ is minimized by the constellation. The first ML detector 213 detects the first solution by performing an operation on $4^2$ first candidates.

$$s = \arg\min_{c_1}\|y - Hc_1\|^2 \quad \text{[Equation 4]}$$

, where $C_1 \in C^{M1}$.

As shown in FIG. 4c, the second candidate determining unit 214 of the detector 210 establishes a second candidate set $C^{M2}$ in step S340. The second candidate set $C^{M2}$ includes the first solution s and three constellations in a direction of the first solution s from the output signal z of the ZF detector 211 since the direction of the first solution s from the output signal z is a direction in which an increase slope of the cost function is gentler. Accordingly, the second candidate determining unit 214 determines constellations in the direction having the gentler increase slope of the cost function as another candidate set. The second candidate set $C^{M2}$ includes $4^2$ candidate combinations.

The second ML detector 215 of the detector 210 detects a final solution $\hat{d}$ in step S350 by applying the ML detection to the received signal y and the second candidate set $C^{M2}$ determined in step S340 as shown in Equation 5. That is, the second ML detector 215 selects a constellation of the second candidate set $C^{M2}$ as the final solution $\hat{d}$, in which a cost function $\|y-Hc_2\|^2$ is minimized by the constellation. The final solution $\hat{d}$ is estimated as the transmission signal. The second ML detector 215 determines the final solution by performing an operation on 15 candidates except the first solutions among the $4^2$ second candidates.

$$\hat{d} = \arg \min_{c_2} \|y - Hc_2\|^2 \qquad [\text{Equation 5}]$$

, where $C_2 \in C^{M2}$.

As described above, the receiver 200 according to the exemplary embodiment of the present invention detects the transmission signal by applying the ML detection to the received signal twice after applying the ZF detection to the received signal. For example, when M transmit antennas are used and four constellations for each antenna are used as candidates, the first ML detector 213 performs an operation on $4^M$ candidates, and the second ML detector 215 performs an operation on $(4^M-1)$ candidates. The above detection method according to the exemplary embodiment of the present invention has less affection of singular values spread of the channel matrix compared to the ZF detection method, and has less complexity compared to the ML detection method, which will be described with reference to FIG. 5a and FIG. 5b.

Figure 5A:
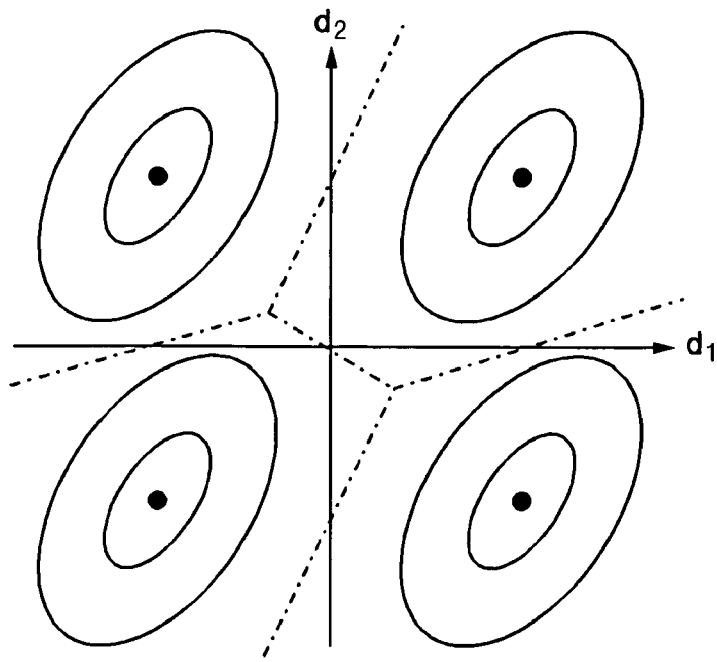
FIG. 5a and FIG. 5b respectively show diagrams for representing performance deterioration caused by spreading singular values of respective channels in a zero forcing detection method.
Figure 5B:
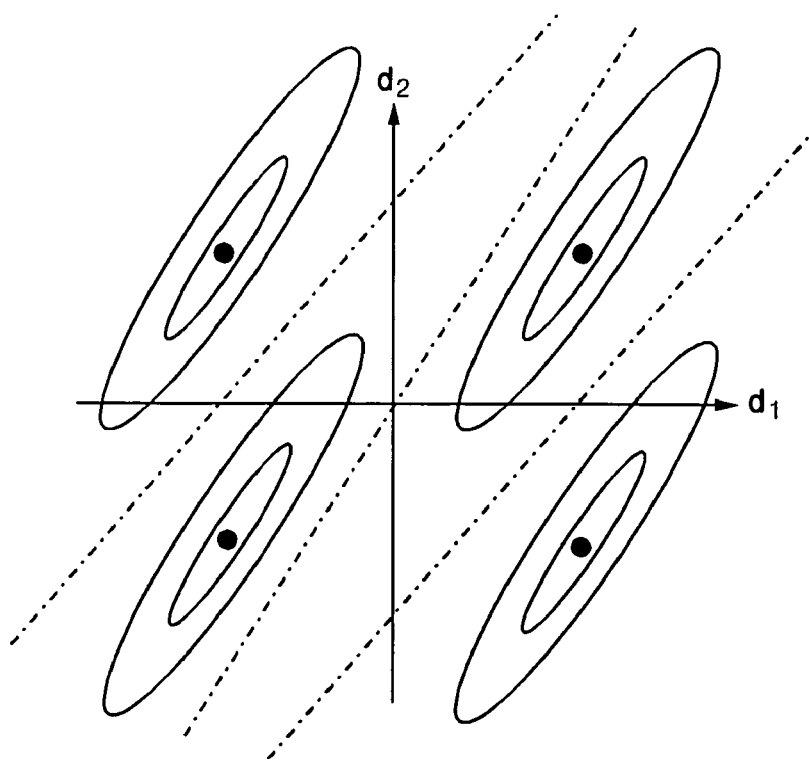

Performance of the detection method according to the exemplary embodiment of the present invention and the ZF detection method are compared to each other, which will be shown in FIG. 5a and FIG. 5b. FIG. 5a and FIG. 5b respectively show diagrams for representing performance deterioration caused by the singular value spread of respective channels in the ZF detection method, and the singular value spread shown in FIG. 5a is less than the same shown in FIG. 5b.

As shown in Equation 3, in the ZF detection method, since the detection is performed within a received signal area regardless of channel characteristics, the performance is deteriorated by a poor grain boundary of the ZF detection method in a poor quality channel having a great singular value spread of the channel matrix. The singular value spread of the channel matrix is obtained by dividing a maximum singular value of the channel matrix by a minimum singular value. Differently from the ZF detection method, since the grain boundary is determined within a transmission data area regardless of channels in the ML detection method, the performance is not deteriorated by the singular value spread.

In further detail, it will be assumed that the transmitter 100 transmits a binary phase shift keying (BPSK) transmission signal [d1 and d2] through two transmit antennas 1401 and 1402, the transmission signal passes through real number channel, and a real number white noise is added to the transmission signal. In this case, a covariance of a noise vector is affected by the singular value of the channel while the received signal is multiplied by the inverse matrix of the channel as shown in Equation 3. Accordingly, a probability density function (PDF) of a ZF detected signal of the respective constellations becomes close to a circle as shown in FIG. 5a when the singular value spread is little since the maximum singular value is similar to the minimum singular value. There is little performance difference between a case that the ZF grain boundary is established to be abscissa and ordinate axes and a case that the ZF grain boundary is established to be optimum considering a singular value of the channel.

However, the PDF of the ZF detected signal of the respective constellations is close to an oval as shown in FIG. 5b when the singular value spread of the channel is great. In this case, the performance difference will be greater when the ZF grain boundary is determined to be the abscissa and ordinate axes. As described, the performance is deteriorated in the ZF detection method since the PDF of a signal according to the singular value spread of the channel is not considered. Accordingly, in the exemplary embodiment of the present invention, a problem of the ZF detection method is solved since the final solution is determined by the ML detection method after an approximate detection period is established by the ZF detection method.

The detection method according to the exemplary embodiment of the present invention and the ML detection method will be described while being compared with each other.

When the transmitter 100 uses the two transmit antennas and the 64 QAM method, $64^2$ constellations are provided. In this case, a solution is detected by calculating and comparing 4096 combinations of the $64^2$ constellations in the ML detection method. However, according to the exemplary embodiment of the present invention, a solution is detected by calculating a cost function for $(4^2-1)(=15)$ candidates after determining a first solution by calculating a cost function for $4^2 (=16)$ candidates which is a combination of the constellations close to the output signal of the ZF detector. Accordingly, the detection method according to the exemplary embodiment of the present invention has the complexity of 0.757 % [=(31/4096)*100] compared to the ML detection method.

Figure 6:
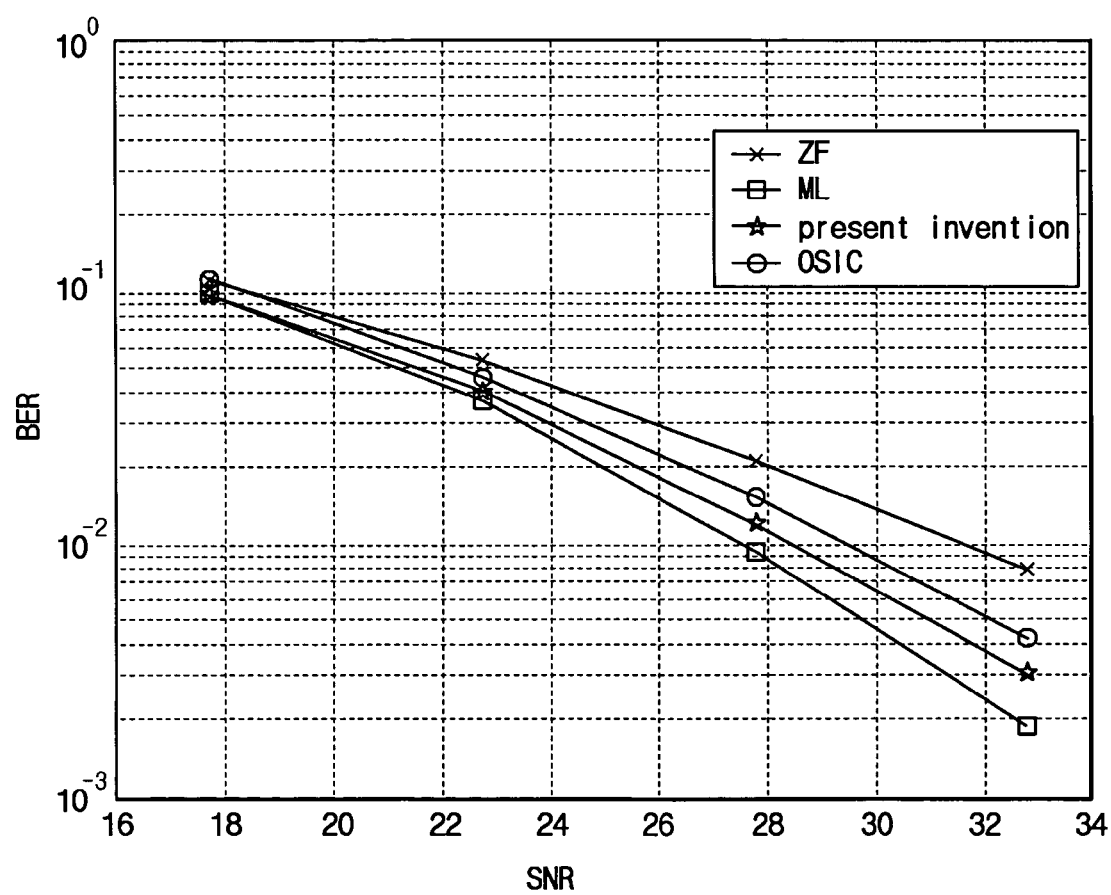
FIG. 6 shows a diagram for representing bit error rates according to detection methods when two antennas and 64 quadrature amplitude modulation are used.

FIG. 6 shows a diagram for representing bit error rates according to detection methods when the two transmit antennas and the 64 QAM are used. In FIG. 6, an abscissa axis is a signal to noise ratio (SNR) of the receive antenna and an ordinate axis is a bit error rate. As shown in FIG. 6, while the performance of the detection method according to the exemplary embodiment of the present invention is reduced by 1 dB compared to the ML detection method, it is respectively increased by 1 dB and 3 dB compared to the OSIC method and the ZF detection method.

While it has been described that the four constellations are established as the candidates for each transmit antenna according to the exemplary embodiment of the present invention, more constellations or fewer constellations may be established as the candidates. The number of the constellations established as the candidates is established to be fewer than the number of the constellations according to the modulation methods. That is, constellations are established as the candidates at fewer than 64 in the 64-QAM method. According to the exemplary embodiment of the present invention, the performance is greater than the same of the ZF detection method, and the complexity is less than the same of the ML detection method.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A receiver of a multiple input multiple output system for receiving signals by a plurality of receive antennas through a channel when transmission signals are transmitted by a plurality of transmit antennas, the receiver comprising:

a first detector for estimating the transmission signal from the received signal with reference to channel information;

a first candidate determining unit for determining P constellations close to an output signal of the first detector as first candidates for each transmit antenna, wherein the first candidates including $P^M$ combinations in total, P being a number smaller than the number of constellations of a modulation method used by the transmission signals and M being the total number of transmit antennas in the multiple input multiple output system;

a second detector for determining a first solution of the received signal among a combination of the first candidates;

a second candidate determining unit for determining Q constellations in a direction of the first solution from the output signal of the first detector as second candidates for each transmit antenna, wherein the second candidates including $(Q^M-1)$ combinations in total, Q being a number smaller than the number of constellations of a modulation method used by the transmission signals; and a third detector for determining a second solution of the received signal among a combination of the second candidates and detecting the received signal from the second solution.

2. The receiver of claim 1, wherein the first detector performs an operation of an inverse matrix of a channel matrix on the received signal, and outputs the output signal, where the channel matrix represents the channel characteristics.

3. The receiver of claim 1, wherein:

the second detector outputs one first candidate of the combination of the first candidates as the first solution, the one first candidate minimizing a cost function of the received signal; and the third detector outputs one second candidate of the combination of the second candidates as the second solution, the one second candidate minimizing a cost function of the received signal.

4. The receiver of claim 3, wherein P=Q=4.

5. A method for detecting a received signal in a multiple input multiple output for receiving signals by a plurality of receive antennas through a channel after the transmission signals are transmitted by a plurality of transmit antennas, the method comprising:

outputting an output signal after detecting the transmission signal from the received signal by using an inverse matrix of a channel matrix representing channel characteristics;

determining P constellations close to the output signal as first candidates for each transmit antenna, and determining a first solution minimizing a cost function of the received signal among a combination of the first candidates, wherein the first candidates including $P^M$ combinations in total, P being a number smaller than the number of constellations of a modulation method used by the transmission signals and M being the total number of transmit antennas in the multiple input multiple output system; and determining Q constellations in a direction of the first solution from the output signal as second candidates for each transmission signal, and determining a second solution minimizing a cost function of the received signal among a combination of the second candidates, wherein the second candidates including $(Q^M-1)$ combinations in total, Q being a number smaller than the number of constellations of a modulation method used by the transmission signals.

6. The method of claim 5, wherein the output signal is determined to be $H^+y$, where $H^+$ denotes an inverse matrix of a channel matrix, and y denotes the received signal.

7. The method of claim 5, wherein the cost function is a cost function used for a maximum likelihood detection method.

8. The method of claim 5, wherein the cost function is shown as $\|y-H_{C1}\|^2$, where y denotes the received signal, H denotes an inverse matrix of a channel matrix, and $c_1$ denotes the combination of the first candidates or the combination of the second candidates.

9. The method of claim 5, wherein P=Q=4.

10. A method for detecting a received signal in a multiple input multiple output system for receiving signals by a plurality of receive antennas through a channel after the transmission signals are transmitted by a plurality of transmit antennas, the method comprising:

detecting the received signal in a zero forcing (ZF) method;

selecting P first constellations close to the signal detected in the ZF method;

detecting the received signal in a maximum likelihood (ML) method by establishing the selected plurality of the first constellations as first candidates, wherein the first candidates including $P^M$ combinations in total, P being a number smaller than the number of constellations of a modulation method used by the transmission signals and M being the total number of transmit antennas in the multiple input multiple output system;

selecting Q second constellations in a direction of the signal detected in the ML method from the signal detected in the ZF method; and detecting the received signal by establishing the selected plurality of second constellations as second candidates, wherein the second candidates including $(Q^M-1)$ combinations in total, Q being a number smaller than the number of constellations of a modulation method used by the transmission signals.

11. The method of claim 10, wherein the first and second constellations are selected for the respective transmit antennas.

* * * * *